US012751871B2

(12) United States Patent
Jones

(10) Patent No.: US 12,751,871 B2
(45) Date of Patent: Oct. 6, 2026

(54) PUMP-ACTION WHEELCHAIR AND CONVERSION KIT

(71) Applicant: Micheal Don Jones, Portland, OR (US)

(72) Inventor: Micheal Don Jones, Portland, OR (US)

( * ) Notice: Subject to any disclaimer, the term of this patent is extended or adjusted under 35 U.S.C. 154(b) by 435 days.

(21) Appl. No.: 18/369,494

(22) Filed: Sep. 18, 2023

(65) Prior Publication Data

US 2024/0115442 A1 Apr. 11, 2024

Related U.S. Application Data

(60) Provisional application No. 63/413,570, filed on Oct. 5, 2022.

(51) Int. Cl.

| | |
|---|---|
| ***A61G 5/02*** | (2006.01) |
| ***A61G 5/04*** | (2013.01) |
| ***A61G 5/08*** | (2006.01) |
| ***A61G 5/10*** | (2006.01) |

(52) U.S. Cl.

CPC ............ *A61G 5/023* (2013.01); *A61G 5/025* (2013.01); *A61G 5/048* (2016.11); *A61G 5/08* (2013.01); *A61G 5/101* (2013.01); *A61G 5/1013* (2013.01); *A61G 5/1051* (2016.11)

(58) Field of Classification Search

CPC ...... A61G 5/023; A61G 5/1051; A61G 5/048; A61G 5/025; A61G 5/08; A61G 5/101; A61G 5/1013

See application file for complete search history.

(56) References Cited

U.S. PATENT DOCUMENTS

| | | | | | |
|---|---|---|---|---|---|
| 3,666,292 | A | | 5/1972 | Bartos | |
| 4,560,181 | A | * | 12/1985 | Herron | A61G 5/023 280/244 |
| 4,652,026 | A | * | 3/1987 | Byrge | A61G 5/022 280/255 |
| 4,811,964 | A | * | 3/1989 | Horn | A61G 5/025 280/243 |
| 4,865,344 | A | | 9/1989 | Romero et al. | |
| 4,993,732 | A | | 2/1991 | Wedemeyer | |
| 5,683,321 | A | * | 11/1997 | Barnett | B62M 1/28 280/250 |
| 5,941,547 | A | | 8/1999 | Drake | |

(Continued)

*Primary Examiner* — Alentin Neacsu
*Assistant Examiner* — Michael R Stabley
(74) *Attorney, Agent, or Firm* — Craig R. Rogers; SIMPLE IP Law, PC

(57) ABSTRACT

A pump-action wheelchair includes one or more pumping arm(s). A driving wheel is arranged on each side of the wheelchair. The pumping arm(s) is/are connected to two driving mechanisms that are connected to driving axles for the driving wheels. A handle bar can be connected to the pumping arm. The handle bar can be lowered to permit an operator to more easily climb into the wheelchair and then raised into an operating position before performing the pumping action. Different forces can be applied by the driving mechanisms to the driving wheels in response to rotation of the handle bar to steer the wheelchair. A reverse mechanism can be provided to operate the wheel chair in reverse. A conversion kit can convert a conventional wheelchair into a pump-action wheelchair. Foot rests may be connected to the pumping arm to move forward and rearward in response to the pumping action.

20 Claims, 7 Drawing Sheets

(56) References Cited

U.S. PATENT DOCUMENTS

| | | | | |
|---|---|---|---|---|
| 6,234,504 | B1 * | 5/2001 | Taylor | A61G 5/023<br>280/DIG. 10 |
| 7,780,179 | B2 * | 8/2010 | Brown | A61G 5/023<br>280/247 |
| 8,186,699 | B2 * | 5/2012 | Green | A61G 5/025<br>280/242.1 |
| 10,548,785 | B2 * | 2/2020 | Vermij | A61G 5/021 |
| 10,722,409 | B2 * | 7/2020 | Robins | A61G 5/023 |
| 10,940,063 | B2 * | 3/2021 | Eason | A61G 5/1008 |
| 2006/0288810 | A1 | 12/2006 | Vroom | |
| 2009/0051138 | A1 | 2/2009 | Kylstra | |
| 2015/0190292 | A1 | 7/2015 | Robins | |

* cited by examiner

PUMP-ACTION WHEELCHAIR AND CONVERSION KIT

PRIORITY CLAIM

This application is a non-provisional of, and claims priority from, U.S. Provisional Patent Application Ser. No. 63/413,570, filed Oct. 5, 2022, the contents of which are incorporated herein by reference in their entirety.

BACKGROUND OF THE INVENTION

Field of the Invention

This invention relates generally to mobility vehicles. More particularly, this invention relates primarily to mobility vehicles such as wheelchairs and the like that are specially designed to provide increased mobility and therapy for handicapped individuals.

Related Art

Applicant is the inventor of U.S. Pat. Nos. 5,829,772; 6,179,314; 6,932,370; 10,479,439; and 11,447,204, related to pump-action vehicles, the contents of each of which are incorporated herein by reference in their entireties. Pump-action vehicles have been used as children's toys and as therapy devices for children and adults with disabilities, including learning or developmental disorders. They have also been proposed as transportation devices for adults.

Conventional manually-operated wheelchairs, such as those depicted in FIGS. 1 and 2, require that hands be placed on or near dirty driving wheels to propel the wheelchair forward or backwards. These large, hand-operated driving wheels can be cumbersome and difficult for many people to operate. Powered wheelchairs provide no exercise for the operator. Furthermore, conventional wheelchairs provide no mechanism for exercising a person's legs while operating.

What would be desirable is a pump-action wheelchair that permits movement based on simple arm motions and provides enhanced convenience, comfort, accessibility, and therapeutic movement to users of the wheelchair, including handicapped persons. It would also be desirable to have a kit for converting a conventional wheelchair into a pump-action wheelchair.

SUMMARY OF THE INVENTION

According to various embodiments and principles of the present inventive concepts, a pump-action wheelchair can be provided having numerous improvements over the related art, including, for instance, a small footprint and tight turn radius, along with an improved driving system and increased therapeutic benefits. The pump-action wheelchair can also be easily transportable.

In particular, principles of the present inventive concepts provide a pump-action wheelchair that can be driven using simple arm motions such as a pumping or rowing action. A pumping (or pumper) arm may be provided, for instance, which propels the vehicle through a simple pumping action. The pumping arm can include a handle bar that can be lowered for an operator to climb into the chair and then raised into an operating position to permit pumping. Alternatively, rowing (or rower) arms may be provided along both sides of the wheelchair which propel the vehicle based on a simple rowing action. A motor can also be provided to assist in providing movement. The front wheels can be similar to those of a conventional wheelchair and can freely pivot to move in a driving direction.

A pump-action wheelchair according to principles of the present inventive concepts can further include one or more foot rest(s) that engage the feet of the operator and move forward and backward during operation of the pumping arm or rowing arms. The foot rests may, for example, be mounted on posts or bars (or other mechanical linkages) that connect to the pumping arm. Stops or limiters could be provided to limit the forward and rearward movement of the foot rests.

In one embodiment, a foot rest is arranged on each side of the wheelchair to accommodate each of the operator's feet. Each foot rest is preferably connected to the pumping arm through a mechanical connection such as arms, bars, posts, or other transfer linkages. As the pumping arm is actuated, each of the foot rests moves forward and backward in opposition to the movement of the handle bar. More particularly, as the handle bar is pulled rearward (or backward toward the operator), the foot rests move forward. As the handle bar is pushed forward (away from the operator), the foot rests move rearward. Alternatively, one foot rest could accommodate both of a user's feet.

The foot rest(s) can have one or more guards that help keep an operator's feet in position within the foot rest(s) during operation. The guards could, for instance, be raised edges of the rest itself or other attached ridges or structures that keep the operator's feet from sliding out of the foot rest(s). Using the foot rest(s) connected to the pumper or rower arms, the operator's feet can move forward and rearward during operation of the wheelchair and provide therapeutic exercise to the operator's legs.

The operator could also move the foot rests themselves using their leg muscles to assist in the pumping action. The foot rests can include a tread pattern and/or friction surface that helps maintain traction between the operator's feet and the foot rest. For instance, a tread pattern can be formed directly on the foot rest, or a rubberized or other gripping surface can be provided on top of the foot rest.

In an embodiment having two rower arms rather than a single pumping arm, two separate foot rests could be provided and independently connected an individual one of the rower arms. The foot rests in this embodiment can move forward and rearward in opposition to the movement of the corresponding rower arm.

The pumping or rowing arms may further connect to driving mechanisms of the wheelchair arranged in communication with the driving wheels. In one embodiment, each driving wheel includes a separate driving mechanism. Each driving mechanism can include a driving axle connected to the driving wheel that is selectively driven based on the pumping action and an orientation of the handle bar (or other steering control mechanism). The driving mechanisms can each be configured to selectively operate in a forward or a reverse direction.

In some embodiments, to steer the wheelchair, a steering mechanism can be provided to the pumping arm to selectively engage and disengage the driving mechanisms based on an orientation of a handle bar, steering wheel, or other steering control mechanism. More specifically, in one embodiment, when the handle bar is straight, the driving mechanisms for both driving wheels are driven in a forward direction as a result of the pumping action. When the handle bar is turned slightly to the right, the driving mechanism for the left wheel is engaged to drive the left wheel forward and the driving mechanism for the right wheel is disengaged so that the right wheel is not driven forward. In this manner, the wheelchair can be steered right. When the handle bar is turned sharply to the right, the driving mechanism for the left wheel is engaged to drive the left wheel forward and the driving mechanism for the right wheel is engaged in a reverse direction to drive the right wheel rearward, thus causing the wheelchair to make a sharp right turn or turn in place to the right. Alternatively, the right wheel can be held stationary during the right turning action.

Similarly, when the handle bar is turned slightly to the left, the driving mechanism for the right wheel is engaged to drive the right wheel forward and the driving mechanism for the left wheel is disengaged so that the left wheel is not driven forward. In this manner, the wheelchair can be steered left. When the handle bar is turned sharply to the left, the driving mechanism for the right wheel is engaged to drive the right wheel forward and the driving mechanism for the left wheel is engaged in a reverse direction to drive the left wheel rearward, thus causing the wheelchair to make a sharp left turn or turn in place to the left. Alternatively, the left wheel can be held stationary during the left turning action.

In an alternative embodiment, the orientation of the steering control mechanism can determine how much the pumping action drives the individual driving mechanisms. For instance, gears or other force control devices can be used to control an amount of the pumping force that drives the driving mechanisms based on an orientation of the handle bar. When the handle bar is straight, an equal force can be applied by each driving mechanism. When the handle bar is rotated, a proportional force can be applied from the appropriate driving mechanisms based on the degree of rotation, such that a sharper rotation of the handle bar produces a sharper turn and a lesser rotation produces a more gradual turn.

In a rowing (or rower) arm embodiment, steering can be provided by selective operation of the rowing arms. Each rowing arm can independently control one of the driving mechanisms. Operating one rowing arm but not the other, or operating one rowing arm more forcefully than the other, can cause the wheelchair to turn in a direction away from the more forcefully operated rowing arm.

The pumper arm may further include a lever or other actuator, such as a squeeze bar, that reverses a driving direction of the wheelchair. When the lever is pulled, the pumping action drives the driving mechanisms and the connected wheels in a reverse direction. With the lever pulled, the steering operations described above are also operated in reverse.

Each of the driving mechanisms may include a driving belt that travels in a loop around two wheels. The belt and wheels could, of course, be readily replaced with a chain and sprockets, or with ropes or cords and pulleys, gears, or wheels, or other driving mechanisms. The driving mechanism may be arranged substantially horizontally with a first, free spinning wheel arranged toward the front (or back) of the wheelchair. A second, drive wheel is fixedly attached to the driving axle, to force rotation of the driving axle in the direction of the rotation of the drive wheel. Alternatively, the driving mechanism may be arranged substantially vertically, with a free spinning wheel arranged above (or below) the drive wheel.

A driving assembly may be arranged over the belt and move forward and backward in response to motion of the pumping arm. The driving assembly may include a base, a bracket, and a driving member (such as a catch) that is pivotably mounted in the bracket. The driving catch may be biased by a spring into a forward driving position, or it may be activated into a forward driving position by a squeeze lever or other mechanism on the handle, or any other mechanical or electrically-assisted activation device.

In the forward driving position, a first engaging end of the driving catch engages with teeth in the belt. The first engaging end of the catch is designed such that it engages with the teeth of the belt when moving in a first (forward) direction, but slides past the teeth without engagement when moving in a second, opposite direction. In this manner, as the driving mechanism moves forward in response to the pumping action, the first engaging end of the catch engages with the teeth of the belt to drive the belt forward. As it does so, the drive wheel is driven forward, driving the axle (along with the connected driving wheels) in a forward direction as well. Thus, the wheelchair is driven forward in response to pumping arm assembly movement.

A reverse mechanism can also be provided that enables operation in a reverse direction. The reverse mechanism may operate by pivoting the driving member into a reverse position against the force provided by the spring. This can be accomplished, for example, using a squeeze handle arranged on the handle bar, or through the use of some other lever or switch that may be connected to the driving mechanism through cabling, for example. When the reverse mechanism is actuated, the driving member (catch) is pivoted such that an opposite, second engaging end of the driving member engages the belt. The second engaging end of the driving member is configured to engage teeth of the belt when moving in a rearward direction, but slide freely without engaging the belt when moving in a forward direction. In this manner, with the reverse mechanism engaged, the driving mechanism engages and drives the belt in a rearward direction, causing the drive wheel, axle, and driving wheels to move in a reverse direction. The wheelchair is thus driven rearward in response to the pumping action.

Alternatively, the driving mechanism can be configured to engage a driving belt, chain, rope, gear, etc., in an appropriate direction during both forward and rearward movement of the pumping arm to drive the wheelchair in the desired direction during both pushing and pulling actions of the pumping arm.

In an alternative embodiment, two driving assemblies can be provided to drive each belt or chain. This embodiment may be useful, for example, when rowing arms are used rather than a pumping arm.

The driving wheels may each include an inflatable tire with a tread pattern arranged thereon designed to engage a ground surface and provide sufficient traction to move the vehicle regardless of terrain.

The wheelchair may be foldable for transportation or storage. More particularly, the wheelchair may be collapsible in a manner similar to conventional wheelchairs, with the additional pump-action components designed to collapse in concert with the wheelchair.

In yet other embodiments, a conversion kit can be provided to convert a conventional hand-driven or other wheelchair into a pump-action wheelchair. In one embodiment, the conversion kit can be designed to secure to a conventional wheelchair at one or more anchor points using a clamping system or other connection mechanism.

For example, the conversion kit may be designed to connect to a conventional wheelchair frame at three (or more) points along each side of the wheelchair using clamps or other connection mechanisms. These connection points can be common to many, if not all, conventional hand-driven wheelchairs. The conversion kit can therefore be a universal conversion kit designed to convert any of numerous conventional wheelchairs to a pump-action wheelchair.

In one embodiment, the wheels of the conventional wheelchair are removed and then resecured to driving axels on the conversion kit. The conversion kit provides one or more pump-action pumping arms connected to the driving axels through a driving mechanism to propel the wheels in response to pump-action of the pumping arm(s). The driving mechanism can drive movement of the driving axels and connected wheels in response to both forward and rearward movement of the pumping arm(s), or in response to movement of the pumping arm(s) in either a forward or rearward direction. A steering mechanism can be provided to steer the wheelchair by selectively driving the left and right driving axels by a desired amount in response to a turning of a steering handle. A reverse mechanism can also be provided to permit the pump-action to drive the wheelchair in reverse when the reverse mechanism is activated.

In another embodiment, a small motor could be provided as an assistance mechanism to help propel the wheelchair. In one embodiment, one or more sensors can be provided that sense resistance as an operator attempts to operate the pumper arms and propel the wheelchair. If a large amount of resistance is detected (such as on an incline or for users with less arm mobility or strength), the sensors can detect this and engage the motor. The motor is preferably connected to the driving axles to help provide a driving force for the vehicle when needed. The motor may also be controllable to drive the axles in either a forward or reverse direction and to provide a differential force to the driving axles to turn the wheelchair based on rotation of the handle bar.

A user selectable switch or other user selectable control could be provided to enable the user to select how much assistance they would like from the motor. A user could, for example, choose to operate the vehicle completely manually, or the user could select up to a maximum amount of assistance from the motor. Preferably, the switch or other user selectable control permits a wide range of options between the minimum and maximum assistance.

Various aspects, embodiments, and configurations of the inventive concepts are possible without departing from the principles disclosed herein. The inventive concepts are therefore not limited to any of the particular aspects, embodiments, or configurations shown or described herein.

BRIEF DESCRIPTION OF DRAWINGS

The foregoing and additional objects, features, and advantages of the present inventive concepts will become more readily apparent from the following detailed description, made with reference to the attached figures, in which.

DETAILED DESCRIPTION OF ILLUSTRATIVE EMBODIMENTS

Various features, benefits, and configurations incorporating principles of the inventive concepts in illustrative embodiments are shown in the accompanying drawings. Additional features, benefits, and configurations will be readily apparent to those of ordinary skill in the art based on this disclosure, and all such features, benefits, and configurations are considered within the scope of the present invention. Various features will now be described in greater detail in connection with embodiments of the present inventive concepts, as illustrated in the accompanying drawings.

Figure 1:
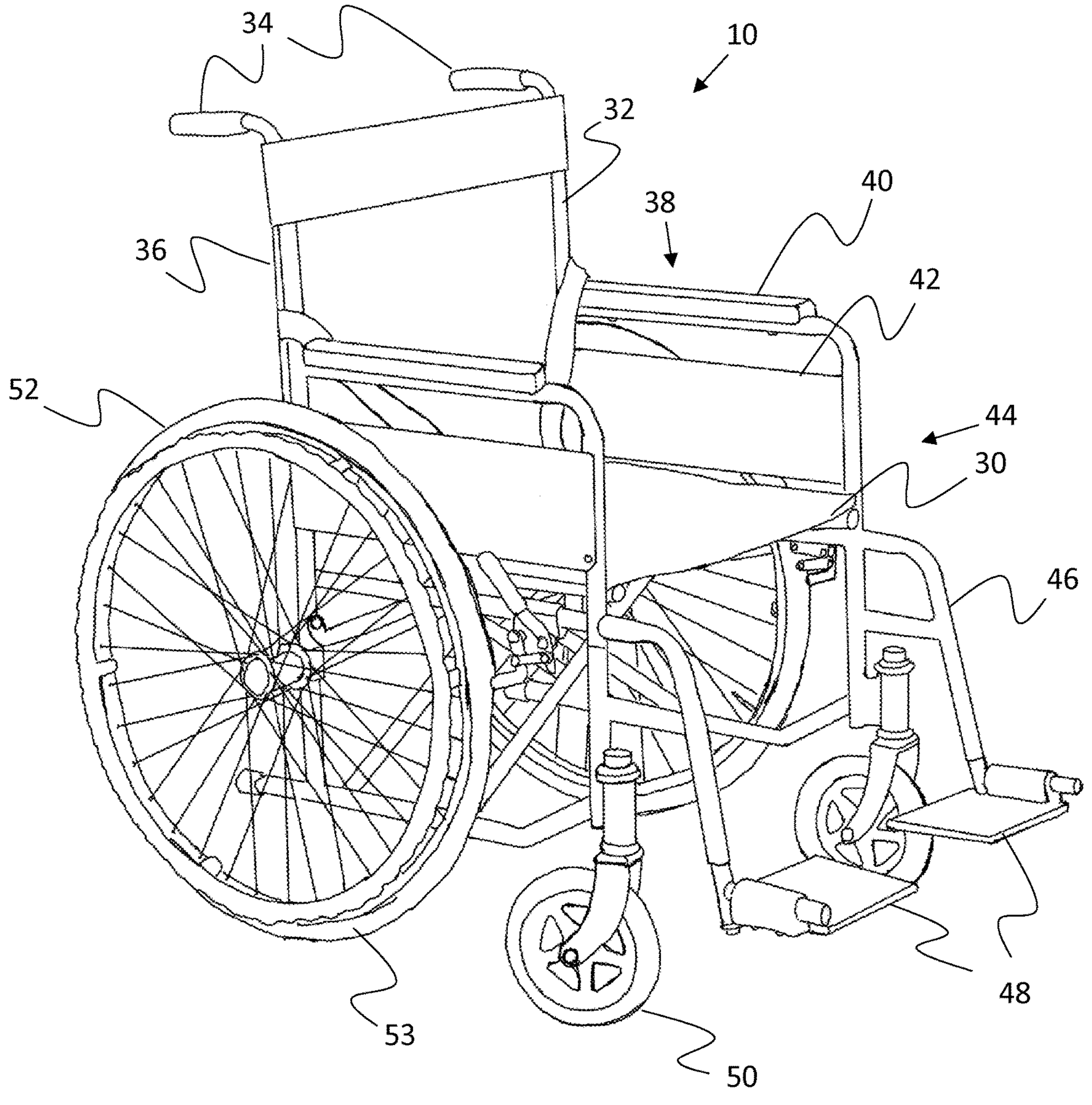
FIG. 1 Conventional Art
FIG. 1 is a perspective view of a conventional wheelchair.
Figure 2:
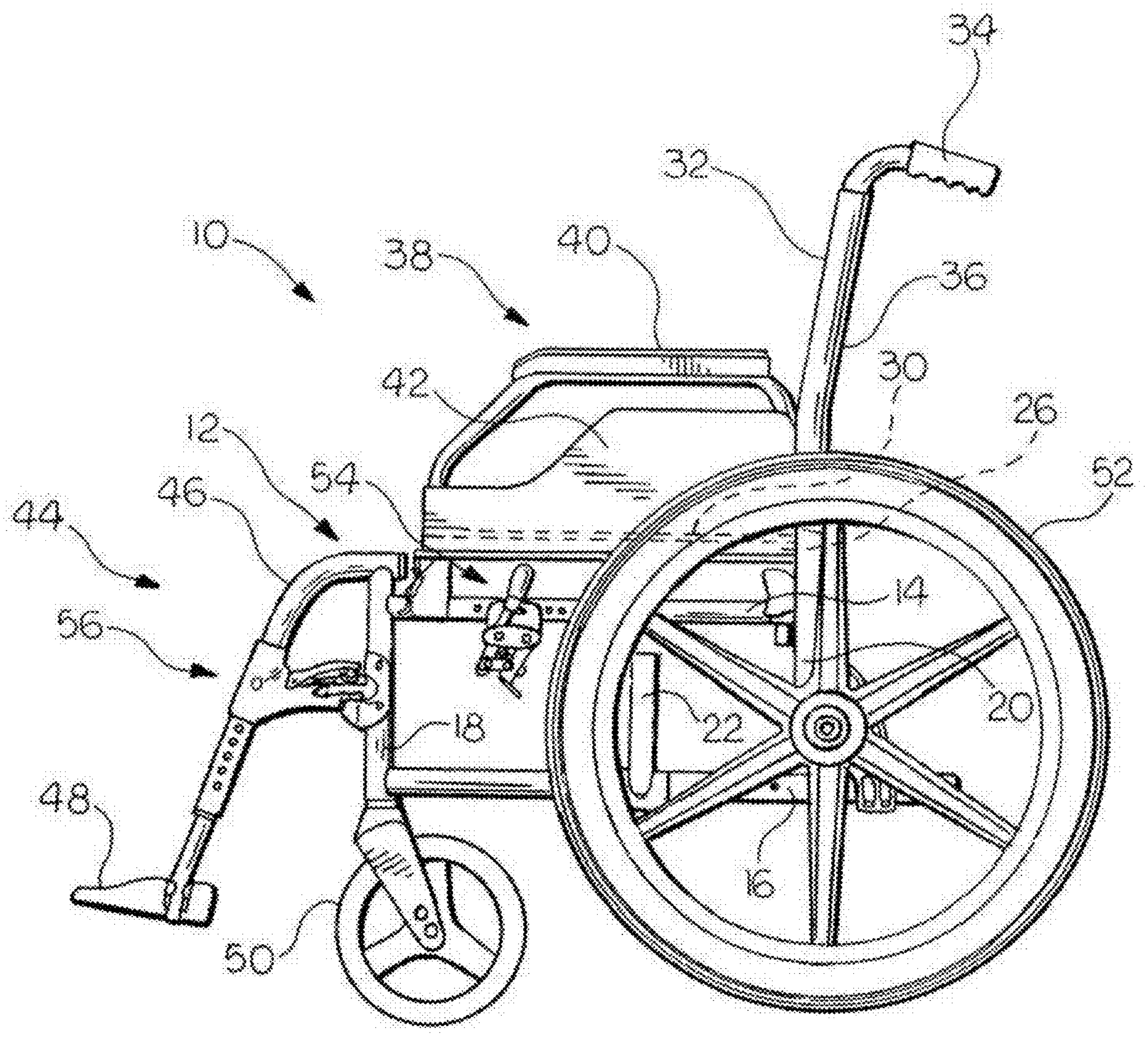
FIG. 2 is a side view of a conventional wheelchair.

Referring first to FIGS. 1 and 2, a conventional wheelchair 10 includes driving wheels 52 that must be manually operated by a user. The driving wheels 52 are mounted to opposite sides of a frame 44 that holds a seat 30 for a user to sit on. A user grips the driving wheels 52 or a connected driving rim 53 with his or her hands and drives the wheels 52 forward or rearward, or holds them stationary, to control the forward, rearward, and turning movements of the wheelchair 10. Unfortunately, these driving actions may be difficult for some persons and may also require the user to make hand contact with dirty wheels 52. Forward wheels 50 are arranged to swivel to permit them to freely move in the direction of the wheelchair 10 travel. Arm rests 40 arranged on arm supports 38 provide a place for a user to rest his/her arms. Guards 42 help prevent undesired contact between a user or their clothing with the wheels 52. Handles 34 arranged on bars 32 provide a way for a support person to push or pull the wheelchair 10 to assist the user. A backrest 36 can also be arranged on the frame 44 to support a user's back. A braking mechanism 54 can be provided for each wheel 52 to lock the wheels 52 in place to prevent unwanted movement of the wheelchair 10. Other frame members and wheelchair components 12, 14, 16, 18, 20, 22, 26 provide stability to the wheelchair 10 along with other features.

The conventional wheelchair 10 also provides foot support members 56 that include foot rests 48 mounted on leg bars 46 that extend from the frame 44. Unfortunately, however, these foot rests 48 remain stationary during operation of the wheelchair 10 and are unable to provide any therapeutic exercise to the legs of the wheelchair 10 operator.

Figure 3:
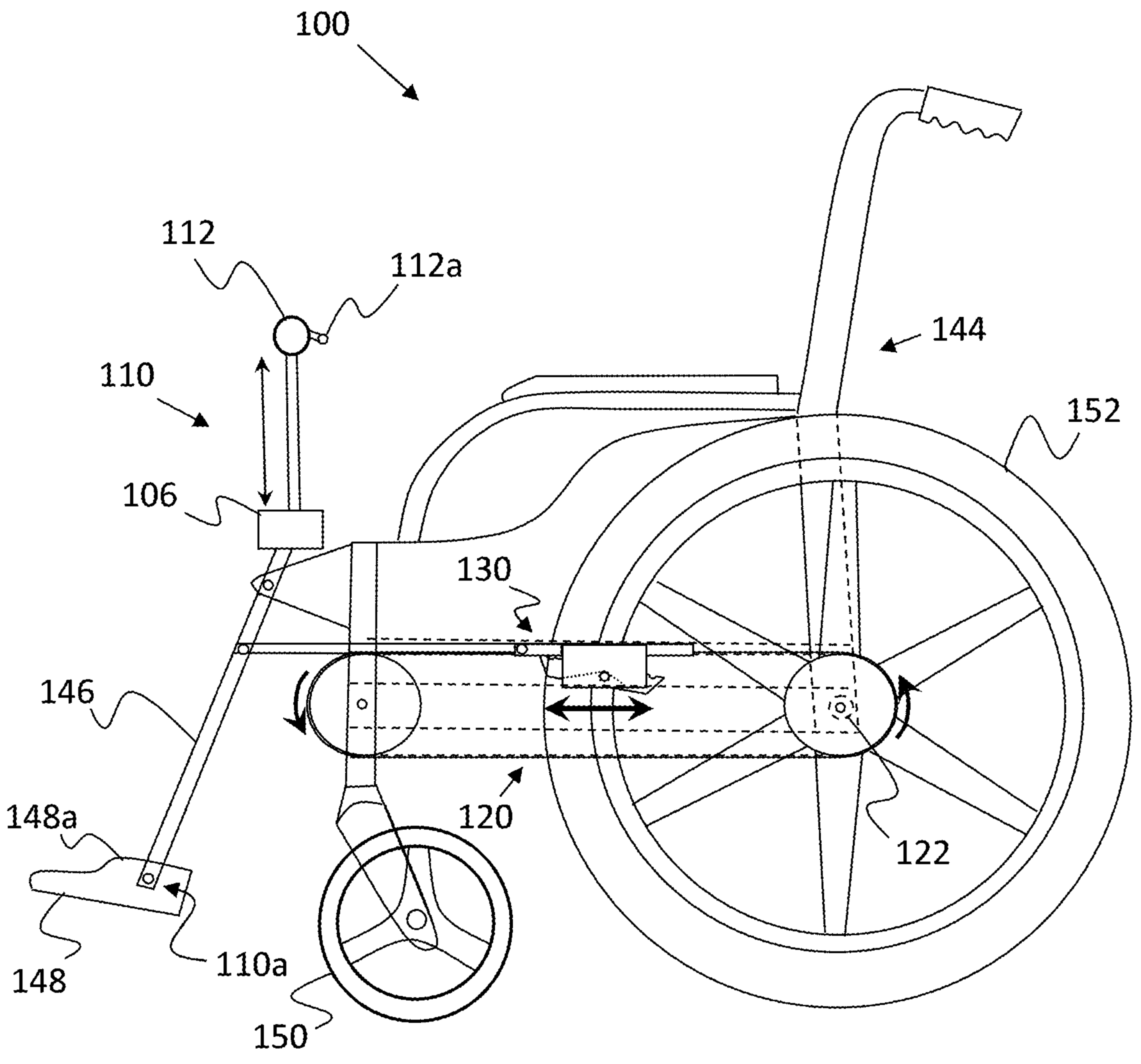
FIG. 3 is a somewhat schematic side view of a wheelchair constructed according to principles of the present inventive concepts.
Figure 4A:
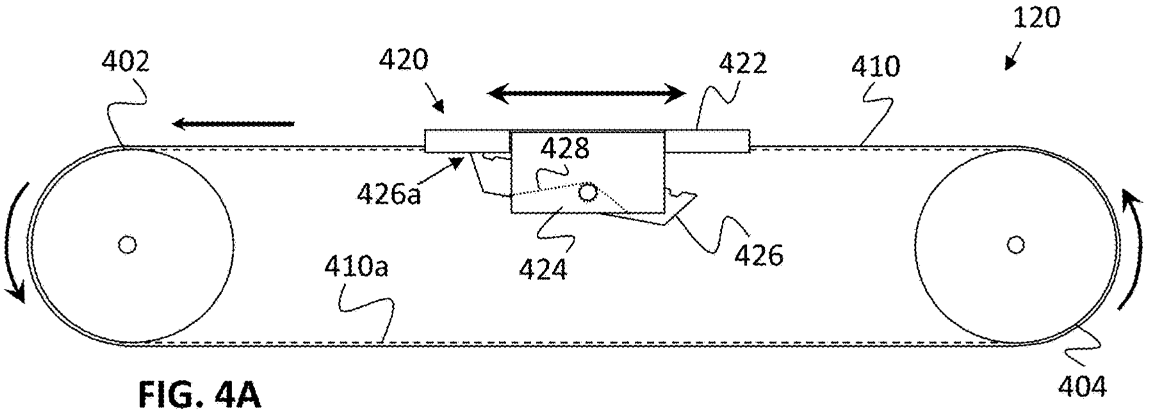
FIG. 4A is a somewhat schematic illustration of a drive mechanism for driving a driving wheel of the wheelchair of FIG. 3.
Figure 4B:
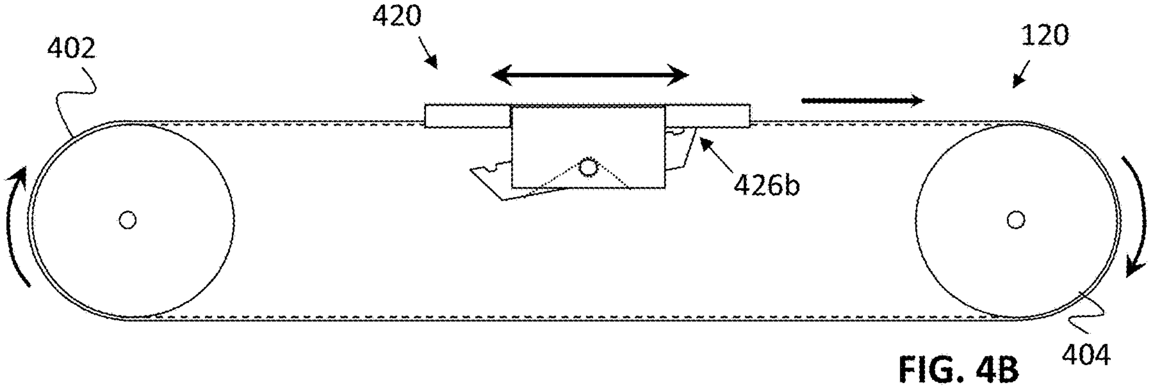
FIG. 4B is a somewhat schematic illustration of a drive mechanism for driving a driving wheel of the wheelchair of FIG. 3, operating in a direction opposite to that of FIG. 4A.
Figure 4C:
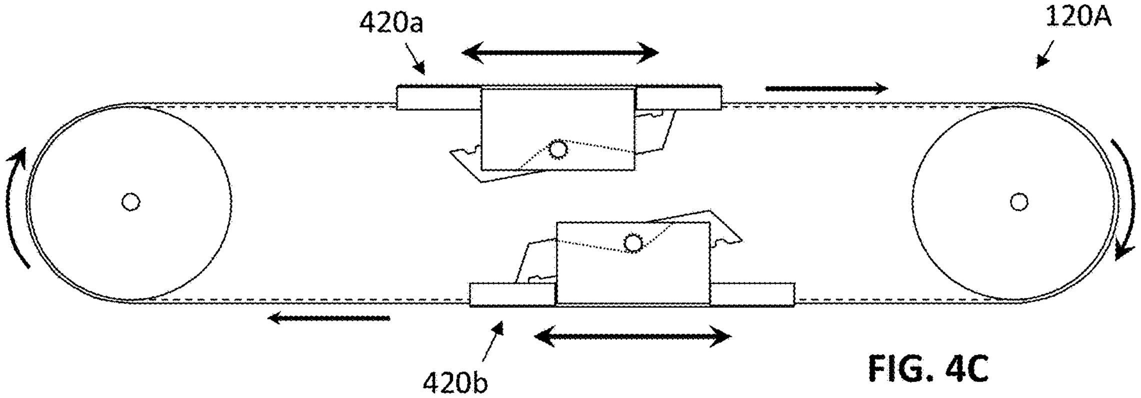
FIG. 4C is a somewhat schematic illustration of a driving mechanism for driving a driving wheel of the wheelchair of FIG. 3, according to an alternative embodiment in which two drive assemblies are provided in a single driving mechanism.
Figure 5:
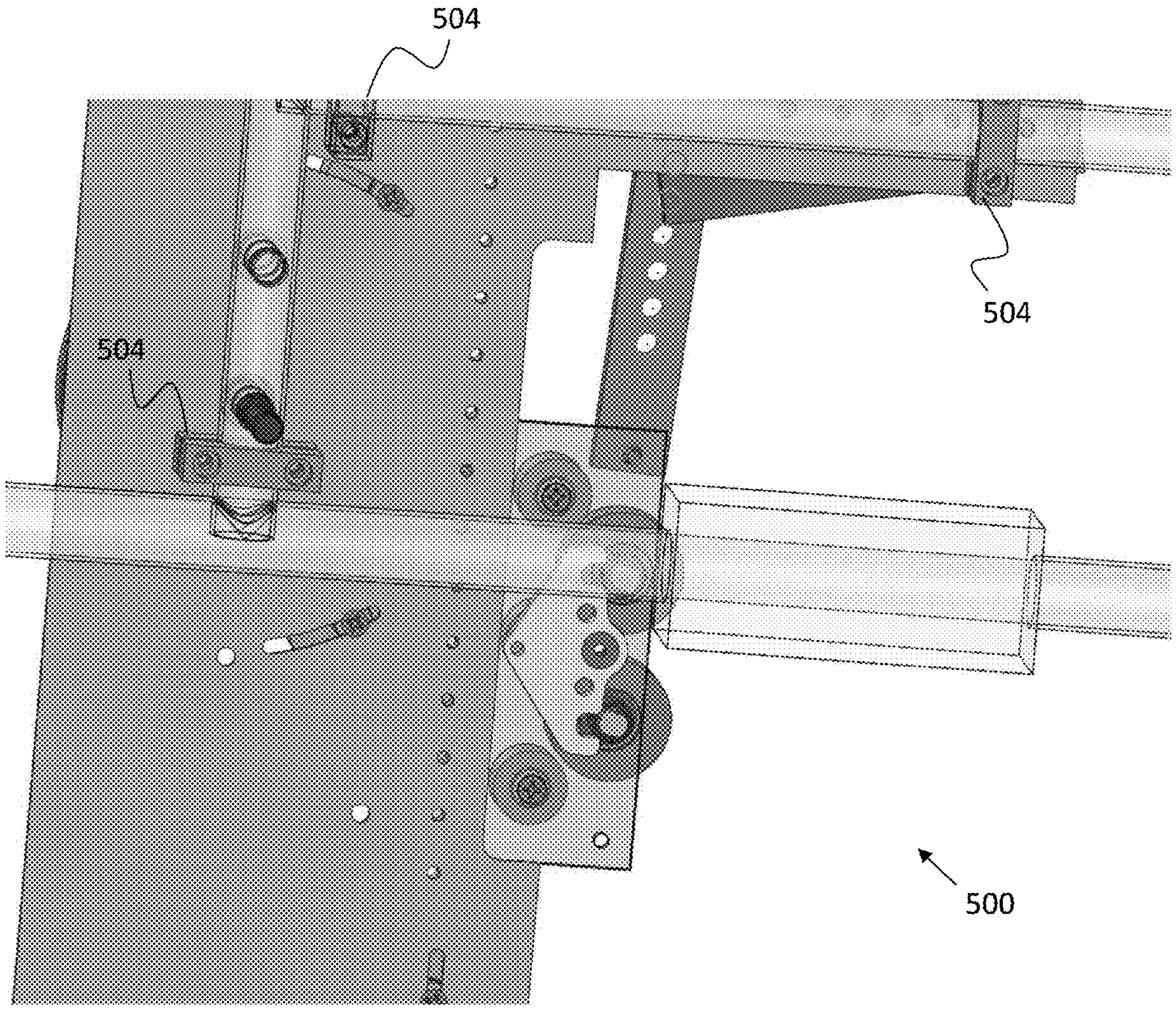
FIG. 5 is a partial view of a conversion kit for converting a conventional hand-driven wheelchair into a pump-action wheelchair according to still further embodiments of the present inventive concepts.
Figure 5A:
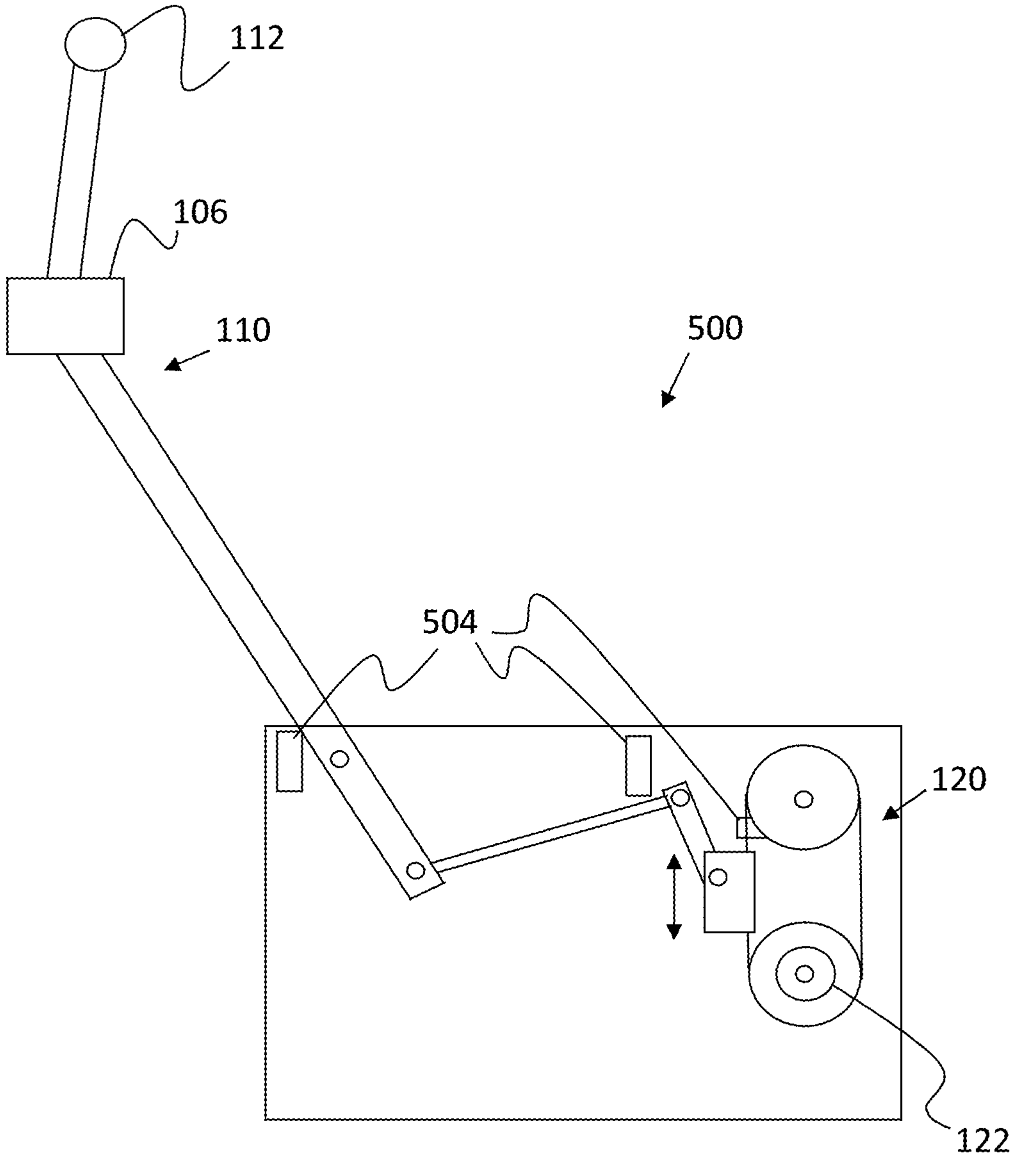
FIG. 5A is a somewhat schematic illustration of a conversion kit for converting a conventional wheelchair into a pump-action wheelchair according to aspects of the present inventive concepts.
Figure 6:
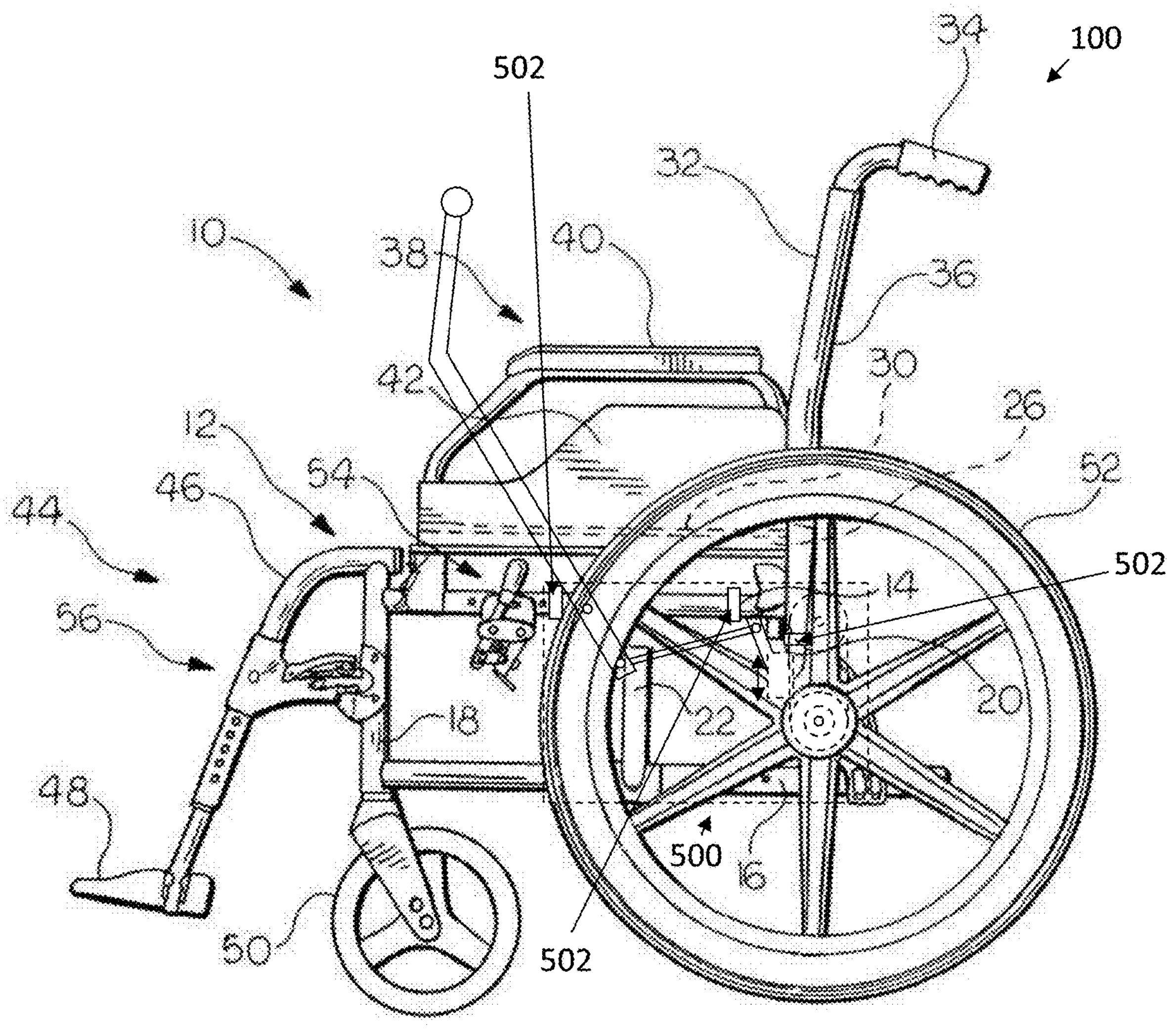
FIG. 6 is a somewhat schematic illustration of a conventional hand-driven wheelchair having a conversion kit attached thereto to provide a pump-action wheelchair.

FIGS. 3 through 4C illustrate a pump-action wheelchair 100 and driving mechanisms 120, 120A according to principles of the present inventive concepts. FIGS. 5 and 5A illustrate conversion kits 500 for converting a conventional hand-driven wheelchair 10 into a pump-action wheelchair 100 according to still further principles of the present inventive concepts. And FIG. 6 illustrates a conventional wheelchair 10 having a conversion kit 500 attached thereto to provide a pump-action wheelchair 100 according to the principles of the present inventive concepts.

Referring to FIGS. 3 through 6, according to various embodiments and principles of the present inventive concepts, a pump-action wheelchair 100 can be provided having numerous improvements over the related art. The pump-action wheelchair 100 can also be easily storable and transportable. The pump-action wheelchair 100 can be constructed as a pump-action wheelchair 100 originally or it can be converted from a conventional hand-driven wheelchair 10 into a pump-action wheelchair 100 using an adapter or conversion kit 500.

In particular, principles of the present inventive concepts provide a pump-action wheelchair 100 that can be driven using simple arm motions such as a pumping or rowing action. A pumping (or pumper) arm 110 may be provided, for instance, which propels the vehicle 100 through a simple pumping action. The pumping arm 110 can include a handle bar 112 that can be lowered for an operator to climb into a seat 130 of the chair 100 and then raised into an operating position to permit pumping. Alternatively, rowing arms (not shown) may be provided along opposite sides the wheelchair 100 which propel the vehicle 100 based on a simple rowing action. A motor (not shown) can also be provided to assist in providing movement.

The front wheels 150 can be similar to the front wheels 50 of a conventional wheelchair 10 and can freely pivot to align with a driving direction. The driving wheels 152 can be substantially smaller than the driving wheels 52 of conventional wheelchairs 10 because they do not need to be operated by a wheelchair occupant. They can, however, also be substantially the same size or identical to wheels 52 of the conventional wheelchair 10.

A pump-action wheelchair 100 according to principles of the present inventive concepts can also include one or more foot rests 148 that engage the feet of the operator and move forward and backward during operation of the pumping arm 110 or rowing arms. The foot rests 148 may, for example, be mounted on posts, bars, or other mechanical linkages 146 that connect to the pumping arm 110. Alternatively, stationary foot rests 48 similar to those of the conventional wheelchair 10 can be used.

In one embodiment, a foot rest 148 is arranged on each side of the wheelchair 100 to accommodate each of the operator's feet. Each foot rest 148 is preferably connected to the pumping arm 110 through a mechanical connection 146 such as arms, bars, posts, or other transfer linkages. As the pumping arm 110 is actuated, each of the foot rests 148 moves forward and backward in opposition to the movement of the handle bar 112. More particularly, as the handle bar 112 is pulled rearward (or backward toward the operator), the foot rests 148 move forward. As the handle bar 112 is pushed forward (away from the operator), the foot rests 148 move rearward.

The foot rests 148 can have one or more guards **148*a* that help keep an operator's feet in position within the foot rest 148 during operation. The guards 148*a* could, for instance, be raised edges of the foot rest 148 itself or other attached ridges or structures that keep the operator's feet from sliding out of the foot rest 148. Using the foot rests 148 connected to the pumping or rower arms 110, the operator's feet can move forward and rearward during operation of the vehicle 100** and provide therapeutic exercise to the operator's legs.

The operator could also move the foot rests 148 themselves using their leg muscles to assist in the pumping action. The foot rests 148 can include a tread pattern and/or friction surface (not shown) that helps maintain traction between the operator's feet and the foot rest 148. For instance, a tread pattern can be formed directly on the foot rest 148, or a rubberized or other gripping surface can be provided on top of the foot rest 148.

In an embodiment (not shown) having two rowing arms rather than a single pumping arm, the foot rests 148 could be independently connected an individual one of the rowing arms. The foot rests 148 in this embodiment can move forward and rearward in opposition to the movement of the corresponding rowing arm.

The pumping or rowing arms may further connect to driving mechanisms 120 of the wheelchair 100 arranged in communication with the driving wheels 152. As noted above, the driving wheels 152 can be substantially smaller than driving wheels 52 of a conventional wheelchair 10 because they do not need to be operable by an occupant. The driving wheels 152 can, however, also be identical to or substantially the same size as those 52 of conventional wheelchairs 10 to enable operation by the operator's hands as an alternative mode of operation or for ease of manufacture.

In one embodiment, each driving wheel 152 includes a separate driving mechanism 120. Each driving mechanism 120 can selectively drive a driving axle 122 connected to the driving wheel 152 based on the pumping or rowing action of the pumping (or rowing) arm 110 and an orientation of the handle bar 112 (or other steering control mechanism). The driving mechanisms 120 can each be configured to selectively operate in a forward or a reverse direction and can further be configured to provide an adjustable amount of driving force.

In one embodiment, to steer the wheelchair 100, a steering mechanism 106 can be provided to the pumping arm 110 to selectively engage and disengage the driving mechanisms 120 based on an orientation of the steering control mechanism 112 (such as a handle bar or steering wheel, for example). More specifically, in this embodiment, when the handle bar 112 is straight, the driving mechanisms 120 for both driving wheels 152 are driven in a forward direction as a result of the pumping action. When the handle bar 112 is turned slightly to the right, the driving mechanism 120 for the left one of the wheels 152 is engaged to drive the left wheel 152 forward and the driving mechanism 120 for the right wheel 152 is disengaged so that the right one of the wheels 152 is not driven forward. In this manner, the wheelchair 100 can be steered right. When the handle bar 112 is turned sharply to the right, the driving mechanism 120 for the left wheel is engaged to drive the left one of the wheels 152 forward and the driving mechanism 120 for the right wheel is engaged in a reverse direction to drive the right one of the wheels 152 rearward, thus causing the wheelchair 100 to make a sharp right turn or turn in place to the right. Alternatively, the right wheel can be held stationary during the right turning action.

Similarly, when the handle bar 112 is turned slightly to the left, the driving mechanism 120 for the right one of the wheels 152 is engaged to drive the right wheel forward and the driving mechanism 120 for the left one of the wheels 152 is disengaged so that the left wheel is not driven forward. In this manner, the wheelchair 100 can be steered left. When the handle bar 112 is turned sharply to the left, the driving mechanism 120 for the right wheel is engaged to drive the right one of the wheels 152 forward and the driving mechanism 120 for the left wheel is engaged in a reverse direction to drive the left one of the wheels 152 rearward, thus causing the wheelchair 100 to make a sharp left turn or turn in place to the left. Alternatively, the left wheel can be held stationary during the left turning action.

In an alternative embodiment, the orientation of the steering control mechanism 112 can determine how much the pumping action drives the individual driving mechanisms 120. For instance, gears or other force control devices (not shown) can be used to control an amount of the pumping force that drives the driving mechanisms 120 based on an orientation of the handle bar 112. When the handle bar 112 is straight, an equal force can be applied by each driving mechanism 120 to each of the driving wheels 152 to drive the wheelchair 100 in a straight line. When the handle bar 112 is rotated, a proportional force can be applied to or from the appropriate driving mechanisms 120 to the driving wheels 152 based on the degree of rotation, such that a sharper rotation of the handle bar 112 produces a sharper turn and a lesser rotation produces a more gradual turn in the direction indicated by the orientation of the handle bar 112.

In a rowing arm embodiment, steering can be provided by selective operation of the rowing arms. Each rowing arm can independently control one of the driving mechanisms. Operating one rowing arm but not the other, or operating one rowing arm more forcefully than the other, can cause the wheelchair to turn in a direction away from the more forcefully operated rowing arm.

The pumping (or rowing) arm may further include a lever or other actuator 112*a*, such as a squeeze bar, that reverses a driving direction of the wheelchair 100. When the lever 112*a* is pulled, the pumping action drives the driving mechanisms 120 and the connected wheels 152 in a reverse direction. With the lever 112*a* pulled, the steering operations described above are also operated in reverse.

The pumping arm 110 may include a handle bar 112 (or other steering control mechanism) connected to a frame 144 of the wheelchair 100 and/or the pumping arm 110 in a way that permits the handle bar 112 to be lowered for operator entry into the seat 130 and raised for operation of the wheelchair 100. A bottom end 110*a* of the pumping arm 110 can be connected to the foot rests 148.

A pumping arm assembly 110 propels the wheelchair 100 through a simple pumping action. The foot rest 148 may engage the feet of the operator and move forward and backward during operation of the pumper arm assembly 110. The foot rest 148 may include two separate foot rests 148, each mounted on an opposite side of the wheelchair 100. Alternatively, the foot rest 148 may be a single foot rest 148 that accommodates both feet. Stops (or limiters) (not shown) may be provided to limit the forward and/or rearward movement of the foot rests 148.

The foot rests 148 may be connected to a bottom end 110*a* of the pumping arm assembly 110 through rods or bars or other mechanical connections 146 providing transfer arms or transfer linkages. The transfer linkages 146 may be adjustable in length to finely tune the relationship between the pumping arm assembly 110 and the foot rests 148. As the pumping arm 110 is actuated, the foot rests 148 move forward and backward in opposition to the movement of the pumping arm handle bar 112. More particularly, as the handle bar 112 moves backward, the foot rests 148 move forward. As the handle bar 112 moves forward, the foot rests 148 move rearward.

The foot rests 148 can have one or more guards 148*a* that help keep an operator's feet in position within the foot rests 148 during operation. The guards 148*a* could, for instance, be raised edges of the rest 148 itself or other attached ridges or structures that keep the operator's feet from sliding out of the foot rests 148. Using the foot rests 148 connected to the pumping arm assembly 110, the operator's feet can move forward and rearward during operation of the vehicle 100 and provide therapeutic exercise to the operator's legs even when they are not used to help provide the driving force.

The operator could, however, use their leg muscles to move the foot rests 148 themselves to assist in the pumping action. The foot rests 148 can include a tread pattern and/or friction surface (not shown) that helps maintain traction between the operator's feet and the foot rests 148. For instance, a tread pattern can be formed directly on the foot rests 148, or a rubberized or other gripping surface can be provided on top of the foot rests 148.

A steering mechanism 106 can be provided in which the pumping arm handle bar 112 (or other steering control mechanism) steers the wheelchair 100 through selective activation of the driving mechanisms 120. The pumping arm assembly 110, for instance, can include an actuation mechanism 106 that actuates the individual driving mechanisms 120 based on an orientation of the handle bar 112. When the handle bar 112 is facing straight forward, both driving mechanisms 120 are driven equally through the pumping action. However, one or more of the driving mechanisms 120 can be driven by a proportional force, disengaged, or operated in reverse as the handle bar 112 is turned to cause a turning operation of the wheelchair 100 by differentially driving the driving wheels 152.

Although various potential driving mechanisms 120 are described below, any desired driving mechanism 120 can be used so long as it is capable of driving the driving wheels 152 in response to a pumping or rowing action of the pumping or rowing arms 110.

In one embodiment, each of the driving mechanisms 120 may include a driving belt 410 that travels in a loop around two wheels 402, 404. Referring specifically to FIGS. 4A and 4B, in one such embodiment, a first, free spinning wheel 402 is arranged toward the front (or rear) of the wheelchair 100. A second drive wheel 404 is fixedly attached to the driving axle 122, to force rotation of the driving axle 122 in the direction of the rotation of the drive wheel 404. The belt 410 and wheels 402, 404 could, of course, be readily replaced with a chain and sprockets.

A driving assembly 420 may be arranged over the belt 410 and move forward and backward in response to motion of the pumping arm 110. The driving assembly 420 may include a base 422, a bracket 424, and a driving member 426 (such as a catch) that is pivotably mounted in the bracket 424. The driving catch 426 may be biased by a spring 428 into a forward driving position, or it may be activated into a forward driving position by a squeeze lever 112*a* or other mechanism on the handle 112, or any other mechanical or electrically-assisted activation device.

Referring specifically to FIG. 4A, in the forward driving position, a first engaging end 426*a* of the driving catch 426 engages with teeth 410*a* in the belt 410. The first engaging end 426*a* of the catch 426 is designed such that it engages with the teeth 410*a* of the belt 410 when moving in a first (forward) direction, but slides past the teeth 410*a* without engagement when moving in a second, opposite direction. In this manner, as the driving mechanism moves forward in response to the pumping action, the first engaging end 426*a* of the catch 426 engages with the teeth 410*a* of the belt 410 to drive the belt 410 forward. As it does so, the drive wheel 404 is driven forward, driving the axle 122 (along with the connected driving wheels 152) in a forward direction as well. Thus, the wheelchair 100 is driven forward in response to pumping arm assembly 110 movement.

A reverse mechanism can also be provided that enables operation in a reverse direction. The reverse mechanism may operate by pivoting the driving member 426 into a reverse position against the force provided by the spring 428. This can be accomplished, for example, using a squeeze handle 112*a* arranged on the handle bar 112, or through the use of some other lever or switch that may be connected to the driving mechanism 120 through cabling, for example. Referring specifically to FIG. 4B, when the reverse mechanism is actuated, the driving member (catch) 426 is pivoted such that an opposite, second engaging end 426*b* of the driving member 426 engages the teeth 410*a* of the belt 410. The second engaging end 426*b* of the driving member 426 is configured to engage teeth 410*a* of the belt 410 when moving in a rearward direction, but slide freely without engaging the belt 410 when moving in a forward direction. In this manner, with the reverse mechanism engaged, the driving mechanism 426 engages and drives the belt 410 in a rearward direction, causing the drive wheel 404, axle 122, and driving wheels 152 to move in a reverse direction. The wheelchair 100 is thus driven rearward in response to the pumping action.

In an alternative embodiment illustrated in FIG. 4C, a driving mechanism 120A includes two driving assemblies 420*a*, 420*b* to drive each belt 410 or chain. This embodiment may be useful, for example, when rowing arms are used rather than a pumping arm.

In addition to the forward and rearward settings, a neutral setting may be provided where driving wheel 152 movement does not move the pumping arm 110 or footrests 148. The neutral setting may, for example be provided where the pumping arm 110 does not engage the driving mechanisms 120, the driving mechanisms 120 do not engage the belt 410, or the driving wheel 152 does not engage the driving axle 122. The neutral setting may be selectable by a service provider or occupant and may be provided to disable the pump-action connections when a service provider desires to push or pull the wheelchair 100 without possible interference by the occupant, or when a wheelchair 100 occupant desires to coast without movement of the pumping arm 110 or foot rests 148.

In another embodiment (not shown), the driving mechanism may include a driving chain that travels in a loop around two sprockets. A first, free spinning sprocket may be arranged near the front (or rear) of the wheelchair in front of (or behind) a second, driving sprocket. Alternatively, the first sprocket may be arranged above (or below) the second, driving sprocket. The second, driving sprocket may be fixedly attached to the driving axle to force rotation of the driving axle in the direction of the rotation of the driving sprocket.

A forward driving catch may be arranged over the chain and move forward and backward (or up and down) in response to the pumping action. The forward driving catch closes over the chain and catches and pulls on the top segment of the chain as it moves forward with the foot rest. As the top of the chain is driven forward, the rearward driving sprocket is also driven forward along with the axle and attached wheels. Thus, the wheelchair is driven forward in response to pumper arm movement. The forward driving catch may be configured to catch by default, or it may be activated by a squeeze lever or other mechanism on the handle, or any other mechanical or electrically-assisted activation device. In an embodiment with an activation mechanism, the forward driving catch may close over and catch the chain only when activated and the driving mechanism may be in a neutral position by default.

The forward driving catch may provide a ratchet-like action that catches and drives the chain forward during forward movement of the catch, but slides rearward freely without catching the chain. This can be accomplished, for instance, by providing engaging edges on the forward end of the catch that catch on the chain as the forward driving catch moves forward. The rearward end of the catch, however, can be open, or slanted away from the chain so that the forward driving catch slides freely rearward without engaging the chain.

A reverse mechanism can be provided in a similar manner. Specifically, a rearward driving catch can also be provided over a bottom segment of the chain and move forward and rearward (or up and down) in response to the pumping action. The rearward driving catch may be activated by a squeeze handle or other activation device. When activated, the rearward driving catch closes over the chain and catches and pulls forward on the bottom of the chain as it moves forward as the pumper arm is pulled. As the bottom of the chain is pulled forward, the driving sprocket and driving axle are driven in reverse, causing rearward motion of the wheelchair. The forward driving catch should also be deactivated while the reverse driving catch is active. The reverse driving catch may have a ratchet-like construction similar to the forward driving catch such that it grabs and pulls the chain during forward movement, but slides freely along the chain during rearward movement.

In another alternative embodiment (not shown), the chain may be replaced by a belt, rope, cable, cord, or other driving system that circles around a free spinning wheel or pulley and the rearward driving axle. The belt, rope, cable, or cord can be configured to provide the driving force to the axle, and the forward and rearward driving catches can be configured to pull it in a forward direction along the top or bottom of the belt, rope, cable, or cord, respectively, to drive the axle in the desired direction for forward or rearward movement of the wheelchair.

In another embodiment (not shown), each driving mechanism includes one or more sprockets arranged on an axle along with a drive wheel. The sprocket receives a chain connected to the pumper or rowing arms (such as through the foot rest) and rotates in response to the arm movement. Gears on the sprocket engage with a drive gear connected to the drive wheel to drive the drive wheel.

In a still further embodiment (not shown), two sprockets are provided on a driving assembly to selectively permit either forward or rearward movement of the wheelchair based on pumper arm action. A first sprocket is connected to a forward driving gear, both of which are rotatably and slidably mounted on the axle on one side of the drive wheel. A second sprocket is connected to a rearward driving gear and both are rotatably and slidably mounted on the axle on an opposite side of the drive wheel from the first sprocket. The first and second sprockets drive their respective gears only in one direction (either forward or reverse, respectively) while spinning freely in the opposite direction.

A chain and spring assembly can be provided for each of the sprockets. A first chain is arranged such that a first end of the first chain connects to the pump assembly. The first chain runs from the pump assembly to a top of the first sprocket and then around the first sprocket. The second end of the first chain, coming from below the first sprocket, connects to one end of a first spring that is connected at its other end to the frame. As the pumper arm is actuated (pulled rearward) it pulls the first chain along with it. As the first chain is pulled, it drives the first sprocket in a forward direction along with the connected forward driving gear and stretches the first spring. The first spring pulls the first chain back into its original position as the pumping arm moves forward again.

The second chain is arranged such that a first end of the second chain connects to one end of a spring that is connected at its other end to the frame. The chain extends from the spring to the top of the second sprocket and then around the sprocket. The second end of the second chain, coming from below the second sprocket, connects to the pump assembly. As the pumping arm is actuated, the second chain drives the second sprocket in a reverse direction along with its connected rearward driving gear. The second spring pulls the second chain back into its original position as the pumping arm moves forward again.

A chain retention system could be provided for one or both of the chains to reduce the length of spring needed to retract the chain to its original position. The chain retention system could include a pulley mounted on an end of a lever arm that is pivotably mounted to the frame. Rather than attach a spring to the end of the chain, a spring is attached to the lever arm such that the lever arm is biased in an extended position. The chain is connected to the frame at a first end near the chain retention system and extends around the pulley, to the sprocket, and then around the sprocket to the foot rest connection point. As the pumping arm retracts and the foot rest moves forward, the chain pulls down on the pulley and lever arm and stretches the spring. When the pumping arm moves forward, the spring pulls on the lever arm to raise it back into its extended position and return the chain to its starting position.

In this embodiment, a drive wheel hub may be rotatably mounted at a center location on the axle. A drive wheel gear may be rotatably arranged on the hub, and the drive wheel may be rigidly secured to the drive wheel gear to rotate along with the drive wheel gear. The drive wheel gear preferably includes teeth on both right and left side faces of the drive wheel gear.

The first and second sprockets may be connected to each other through the drive wheel hub using one or more pins or other mechanical connection that maintains them at a constant, predetermined distance from each other. The mechanical connection between the sprockets preferably maintains a constant distance between the first and second sprockets (with their associated gears) as they slide back and forth along the axle. One or more springs arranged on the axle preferably bias the sprockets in a position where the forward driving gear, connected to the first sprocket, engages a first side of the drive wheel gear arranged on the same side of the drive wheel as the first sprocket. With the forward driving gear engaged, the drive wheel is driven in a forward rotation as the pumper arm is operated, causing the wheelchair to move forward.

A squeeze bar (lever) is preferably provided on one side of the pumping arm handle or one of the rowing-style handles. The squeeze bar may be connected to an actuator bar or shifting mechanism through a cable system. The actuator bar (or arm) is preferably connected to the sprocket assembly. When the squeeze bar is squeezed, the cable tightens and activates the actuator arm or shifting mechanism to move the sprocket assembly. More particularly, in response to a squeeze of the squeeze bar, the actuator arm or shifting mechanism slides the sprocket assembly against the spring bias into a reverse position. The actuator arm may, for instance, be a curved rod or bar that communicates with the second sprocket.

The squeeze bar may, for instance, be configured such that a squeeze of % inch or less is sufficient to move the sprocket assembly between its forward and reverse positions. As the sprocket assembly slides to the reverse position, the forward driving gear disengages from the drive wheel gear, and the rearward driving gear connected to the second sprocket engages with the drive wheel gear on the side opposite the forward driving gear. In this position, as the pumping arm is operated, the driving wheel is driven in a reverse direction, causing the vehicle to move backwards.

Of course, any other desired actuating mechanism (whether mechanical, electrical, or a combination of the two) such as a lever, button, dial, slide, or other device could be used to shift the sprockets from their forward-driving engagement to their rearward-driving engagement. Once the actuating or shifting mechanism is deactuated, the bias spring drives the first sprocket and forward driving gear back into engagement with the drive wheel gear and disengages the rearward driving gear so that operation of the pumping arm will drive the vehicle forward again. The teeth of the driving gears and drive wheel gear can be beveled or angled on their non-driving edges to permit self-alignment as the driving gears are moved into position.

A similar transmission system could also be employed on pedal and other vehicles to shift from forward to reverse. In an embodiment having two handles, such as a rowing-style design, an extra sprocket could be provided on each side of the drive wheel. The extra sprockets facilitate the opposing forward and backward movement of the two handles.

Although various specific driving mechanisms have been described above, any other type of driving mechanism is also contemplated so long as it drives the driving wheels based on a pumping, rowing, or similar-type action.

A braking system (not shown) can also be provided. The braking system could include a braking bar that pushes against one or more of the driving wheels when the brake is actuated. The brake could be actuated using a squeeze lever arranged on a handle of the handle bar opposite to the reverse-actuating mechanism. The squeeze lever could be connected to the braking bar through a cabling system. When the brake squeeze lever is squeezed, the cable tightens and pulls the braking lever up against the driving wheel. The braking system could be lockable to lock the brake in place and keep the vehicle from moving. The brake locking system could, for instance, be a toggle type system in the squeeze lever or a separate latch that folds over the squeeze lever and locks it in place. Of course, the braking system could be actuated in any other desirable manner and include any other desired type of braking system. For instance, a hand lever connected to the frame could be used to actuate and release the brake.

The driving wheels may each include an inflatable tire with a tread pattern mounted thereon and designed to engage a ground surface and provide sufficient traction to move the vehicle regardless of terrain.

The wheelchair may be foldable for transportation or storage. More particularly, the wheelchair may be collapsible in a manner similar to conventional wheelchairs.

Referring now specifically to FIGS. 5, 5A, and 6, according to one embodiment, a conversion kit 500 can be provided to convert a conventional hand-driven or other wheelchair 10 into a pump-action wheelchair 100. The conversion kit 500 can be a universal conversion kit designed to modify any of numerous different conventional wheelchairs 10 into a pump-action wheelchair 100. The conversion kit 500 can, for example, be designed to secure to a conventional hand-driven wheelchair 10 at one or more anchor points 502 using a clamping system 504 or other connection mechanism. In the shown embodiments, the conversion kit 500 is designed to connect to the conventional wheelchair 10 at three or more points 502 along each side of the wheelchair 10 using clamps 504 or other connection mechanisms. These connection points 502 can be common to many, if not all, conventional hand-driven wheelchairs 10.

In these embodiments, the wheels 52 of the conventional wheelchair 10 are removed and then resecured to driving axels 122 on the conversion kit 500. The conversion kit 500 is clamped onto the conventional wheelchair 10 at the desired connection points 502. The conversion kit 500 provides one or more pump-action pumping arms 110 connected to the driving axels 122 through a driving mechanism 120 to propel the wheels 152 in response to pump-action of the pumping arm(s) 110. The driving mechanism 120 can drive movement of the driving axels 122 and connected wheels 152 in response to both forward and rearward movement of the pumping arm(s) 110, or in response to movement of the pumper arm(s) 110 in either a forward or rearward direction. A neutral setting may also be provided in which the pumping arms 110 are disengaged from driving the driving wheels 152.

A steering mechanism 106 can be provided having a steering control mechanism 112 to steer the wheelchair 100 by selectively driving the left and right driving axels 122 by a desired amount in response to a turning of a steering control mechanism 112 (as described previously). A reverse mechanism **112*a* (see FIG. 3) can also be provided to permit the pump-action to drive the wheelchair in reverse when the reverse mechanism 112*a*** is activated.

The conversion kit 500 can further provide pump-action foot pedals (not shown) connected to the pump-action arms 110, or the conventional stationary foot rests 48 can be retained.

Various other designs and embodiments are also contemplated and numerous variations to the specific designs identified above are possible without departing from the spirit and scope of the inventive concepts. For instance, the belt or chain could be a belt, chain, rope, cable, or any other structure or material that wraps around the pulleys or gears. The driving mechanisms could have a gripper, actuator, or catch on one or both sides of belt, chain, rope, cable, or other material. If arranged on both sides, the mechanisms could be configured to catch on opposite sides and move in opposite directions. The principles of these inventive concepts are also usable on mobility vehicles other than wheelchairs.

In another alternative embodiment (not shown), a small motor could be provided as an assistance mechanism to help propel the wheelchair. In one embodiment, one or more sensors can be provided that sense resistance as an operator attempts to operate the pumper arms and propel the wheelchair. If a large amount of resistance is detected (such as on an incline or for users with less arm mobility or strength), the sensors can detect this and engage the motor. The motor is preferably connected to the driving axles to help provide a driving force for the vehicle when needed. The motor may also be controllable to drive the axles in either a forward or reverse direction.

A user selectable switch or other user selectable control could be provided to enable the user to select how much assistance they would like from the motor. A user could, for example, choose to operate the vehicle completely manually, or the user could select up to a maximum amount of assistance from the motor. Preferably, the switch or other user selectable control permits a wide range of options between the minimum and maximum assistance.

Having described and illustrated principles of the present inventive concepts on in various preferred embodiments thereof, it should be apparent that the invention can be modified in arrangement and detail without departing from such principles.

What is claimed is:

1. A pump-action wheelchair comprising:

a frame;

a single pumping arm connected to the frame and configured to pivot rearward and forward around a pivot point to provide a pumping action to the wheelchair;

a pair of driving wheels, wherein one driving wheel is arranged on each side of the wheelchair;

a first driving mechanism configured to drive a first one of the driving wheels in response to the pumping action of the single pumping arm;

a second driving mechanism configured to drive a second one of the driving wheels in response to the pumping action of the single pumping arm;

a steering mechanism connected to the single pumping arm in a manner that permits rotational movement of the steering mechanism; and a steering control mechanism configured to rotate the steering mechanism, wherein driving forces applied by the first and second driving mechanisms to the driving wheels are controlled based on an amount of rotation of the steering control mechanism such that rotation of the steering control mechanism causes a different force to be applied by the first driving mechanism than the second driving mechanism to steer the wheelchair.

2. The pump-action wheelchair according to claim 1, wherein the frame is collapsible to reduce an amount of storage space and facilitate easier transportation of the wheelchair.

3. The pump-action wheelchair according to claim 1, wherein the steering control mechanism comprises a handle bar arranged on the single pumping arm that can be lowered to permit an operator to more easily climb into the wheelchair and then raised into an operating position before performing the pumping action.

4. The pump-action wheelchair according to claim 1, further comprising a foot rest connected to the single pumping arm such that the foot rest moves forward and rearward in response to the pumping action.

5. The pump-action wheelchair according to claim 1, wherein the steering mechanism is connected to the single pumping arm through a universal joint.

6. The pump-action wheelchair according to claim 1, wherein the steering mechanism is configured to cause the driving mechanisms to provide a proportional amount of force to each of the driving wheels that depends upon a degree to which the steering control mechanism is rotated.

7. The pump-action wheelchair according to claim 1, wherein the steering mechanism causes an appropriate one of the driving mechanisms to operate in reverse when the steering control mechanism is rotated by a maximum amount in one direction.

8. A pump-action wheelchair comprising:

a frame having a seat arranged between two driving wheels;

one pumping arm connected to the frame and configured to pivot rearward and forward around a pivot point to provide a pumping action to drive both the driving wheels of the wheelchair;

a first driving mechanism configured to drive a first one of the two driving wheels in response to the pumping action of the pumping arm;

a second driving mechanism configured to drive a second one of the two driving wheels in response to the pumping action of the pumping arm; and a steering mechanism rotatably connected to the pumping arm and configured to provide differential forces to the first and second driving mechanisms such that driving forces applied by the first and second driving mechanisms to the driving wheels are controlled based on an amount of rotation of the steering mechanism.

9. The pump-action wheelchair according to claim 8, wherein the steering mechanism causes an appropriate one of the driving mechanisms to operate in reverse when the steering control mechanism is rotated by a maximum amount in one direction.

10. The pump-action wheelchair according to claim 8, wherein the steering mechanism further comprises a steering control mechanism configured to rotate the steering mechanism.

11. The pump-action wheelchair according to claim 10, wherein the steering control mechanism is a handle bar arranged on the pumping arm that can be lowered to permit an operator to more easily climb into the wheelchair and then raised into an operating position before performing the pumping action.

12. The pump-action wheelchair according to claim 8, further comprising a foot rest connected to the pumping arm such that the foot rest moves forward and rearward in response to the pumping action.

13. The pump-action wheelchair according to claim 8, wherein the steering mechanism includes a steering control mechanism arranged on the pumping arm, wherein driving forces applied by the first and second driving mechanisms to the driving wheels are controlled based on an orientation of the steering control mechanism such that rotation of the steering control mechanism causes a different force to be applied by the first driving mechanism than the second driving mechanism to steer the wheelchair.

14. A conversion kit for converting a conventional wheelchair into a pump-action wheelchair, said conversion kit comprising:

an attachment mechanism configured to secure the conversion kit to the conventional wheelchair at one or more points along a frame of the conventional wheelchair;

a single pumping arm configured to permit an operator to drive the wheelchair using a pumping action;

driving axles configured to secure to driving wheels of the wheelchair and further configured to drive the driving wheels secured to the driving axles in response to the pumping action of the single pumping arm; and a steering mechanism configured to be rotatably connected to the single pumping arm and to provide differential forces to the driving axles in response to rotation of the steering mechanism.

15. The conversion kit according to claim 14, wherein the conversion kit is a universal conversion kit configured to attach to different types of conventional wheelchairs.

16. The conversion kit according to claim 14, wherein the attachment mechanism comprises at least three clamping mechanisms configured to secure the conversion kit to the frame of the conventional wheelchair.

17. The conversion kit according to claim 14 further comprising one or more foot rests configured to move forward and rearward in response to the pumping action.

18. The conversion kit according to claim 14, wherein the steering mechanism includes a steering control mechanism that controls the rotation of the steering mechanism, wherein the steering mechanism is configured to control an amount by which each of the driving wheels is driven depending on an amount by which the steering control mechanism is rotated.

19. The conversion kit according to claim 18, wherein the steering mechanism is configured to cause the driving axles to provide a proportional amount of force to each of the driving wheels that depends upon a degree to which the steering control mechanism is rotated.

20. The conversion kit according to claim 18, wherein the steering mechanism causes an appropriate one of the driving axles to move in reverse when the steering control mechanism is rotated by a maximum amount in one direction.

* * * * *